(12) United States Patent
Al-Azzawi

(10) Patent No.: US 8,266,710 B2
(45) Date of Patent: Sep. 11, 2012

(54) METHODS FOR PREVENTING SOFTWARE PIRACY

(76) Inventor: Jasim Saleh Al-Azzawi, Dubai (AE)

( * ) Notice: Subject to any disclaimer, the term of this patent is extended or adjusted under 35 U.S.C. 154(b) by 517 days.

(21) Appl. No.: 12/540,623

(22) Filed: Aug. 13, 2009

(65) Prior Publication Data

US 2009/0300772 A1    Dec. 3, 2009

Related U.S. Application Data

(63) Continuation-in-part of application No. 10/913,437, filed on Aug. 9, 2004, now abandoned.

(51) Int. Cl.
*G06F 21/00* (2006.01)
(52) U.S. Cl. ............... 726/26; 726/27; 726/28; 726/29; 726/30; 726/31; 726/32; 726/33
(58) Field of Classification Search ............... 726/26–33
See application file for complete search history.

(56) References Cited

U.S. PATENT DOCUMENTS

| | | | | |
|---|---|---|---|---|
| 4,658,093 A | * | 4/1987 | Hellman | 705/52 |
| 5,199,066 A | * | 3/1993 | Logan | 726/29 |
| 5,761,308 A | * | 6/1998 | Torii et al. | 705/52 |
| 2007/0250920 A1 | * | 10/2007 | Lindsay | 726/7 |

* cited by examiner

*Primary Examiner* — Kaveh Abrishamkar
*Assistant Examiner* — Tri Tran
(74) *Attorney, Agent, or Firm* — Moore Patents; David Dreyfuss

(57) ABSTRACT

A method for preventing unauthorized installation of application software is disclosed wherein application software is distributed with a user-readable permanent password, one or more user-readable one-time disposable password, and a hidden password (hidden from users but accessible by the setup program). When the setup program is run, the user must enter the permanent password and disposable password(s). The setup program sends these passwords and the target computer serial number to a remote server which verifies their validity, stores the serial number, and returns a complex password and a new disposable password from a remote passwords folder stored on the remote server. The setup program displays the new disposable password to the user who records it for use in future installations. The complex password is used to enable installation of the software, and it is deleted after installation is complete. Subsequent installation or re-installations, if authorized by the terms of the software license agreement, are performed using the same procedure, except that for each such installation, a new disposable password must be used.

16 Claims, No Drawings

METHODS FOR PREVENTING SOFTWARE PIRACY

CROSS REFERENCE TO RELATED APPLICATIONS

This application is a Continuation-in-Part Application claiming priority from U.S. patent application Ser. No. 10/913,437, filed Aug. 9, 2004.

FIELD OF THE INVENTION

This invention relates generally to methods of preventing the unauthorized copying and distribution of software.

BACKGROUND

Software companies annually spend billions of dollars on research to develop new software and, in return, wish to control their intellectual property by controlling the sale and distribution of their products. However, software piracy has cost such companies billions of dollars in lost profits.

Various methods have been used to limit unauthorized distribution of software. For example, software is often distributed with a printed serial number that must be entered by a user and must match a hidden digital version of that serial number in order to enable installation. Other software installation programs require explicit registration, usually via the internet, to obtain a "registration key" that allows installation and use of the software. Such keys may restrict use to one or two installations, and may also require linking to a computer hardware serial number. Still other installations use a hardware "dongle" connected to a computer I/O port which must be installed to enable use of particular software.

SUMMARY OF THE INVENTION

A method for preventing unauthorized installation of application software is disclosed wherein application software is distributed with a user-readable permanent password, one or more user-readable one-time disposable password, and a hidden password (hidden from users but accessible by the setup program). When the setup program is run, the user must enter the permanent password and disposable password(s). The setup program sends these passwords and the target computer serial number to a remote server which verifies their validity, stores the serial number, and returns a complex password and a new disposable password from a remote passwords folder stored on the remote server. The setup program displays the new disposable password to the user who records it for use in future installations. The complex password is used to enable installation of the software, and it is deleted after installation is complete. Subsequent installation or re-installations, if authorized by the terms of the software license agreement, are performed using the same procedure, except that for each such installation, a new disposable password must be used.

BRIEF DESCRIPTION OF THE DRAWINGS

There are no drawings.

DETAILED DESCRIPTION

Before the present invention is described in detail, it is to be understood that unless otherwise indicated this invention is not limited to specific algorithms, computing machines, operating systems, data storage media, print media, or the like, as such may vary. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a password" includes two or more passwords; reference to "a disc" includes two or more discs, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

DEFINITIONS

CD or CD-ROM: compact disc (optionally tagged with "read-only memory"); an optical data storage device frequently used for software distribution.

DVD or DVD-ROM: digital versatile disc or digital video disc (optionally tagged with "read-only memory"); another optical data storage device with higher data storage capacity than a CD.

Permanent Password: a password, typically printed on a CD cover, which is used to identify a particular authorized copy of some software. The permanent password protects the setup folder which cannot be opened without the permanent password. It is also used to identify a matching remote passwords folder on a remote server used for registration, authentication, and installation authorization.

Hidden Password: a password hidden on a software distribution CD or in a file download or other distribution media. The setup program for software installation sends the hidden password automatically along with the permanent password when it is sent to the remote server. This hidden password adds security since the remote server does not authorize software installation unless both the permanent password and hidden password match those associated with a particular remote passwords folder on the remote server. The permanent password of a different CD cannot be used with the hidden password of the installed CD to open any remote passwords folder. The existence and location of the hidden password is not disclosed, nor is the form it is kept in nor whether and how it is encrypted, nor where the access software is hidden.

Disposable Password: is a new type of password, which may be used several times by the user but only once as a "new" disposable password. Thereafter, depending on the specific embodiment in use, a disposable password can be used as a "used" disposable password which is sent with a new disposable password for authentication to the remote server. The disposable passwords can also be used to authorize the purchase of additional new disposable passwords.

Complex Password: is a very long and complex password by which the setup folder manages the installation of software on a computer. It is located on the remote server in a remote passwords folder. The setup software may receive the complex password encrypted. After decryption, the setup software uses the complex password to install the software and when installation is finished, the setup software deletes the complex password immediately so that it cannot be reused or studied by an unauthorized user.

Remote Passwords Folder: is a folder on a remote server that can be reached over the internet. To access this folder, software on the remote server must receive and use both the assigned permanent password and the assigned hidden password. The disposable passwords, complex password, plus any key parts and secret codes are stored in the remote passwords folder. This software first compares the disposable password or passwords sent with the current valid new and used disposable passwords and does not return any data if the proper match is not found. Depending on the embodiment, a match of a new disposable password to the current valid new password must be made, or additional matches to one or more used disposable password with additional disposable password(s) must also be made to authorize return of data.

Key Parts: are parts of installation software and/or data that are missing from the distribution medium but exist in the remote passwords folder. If authorization is successful, these key parts are sent back to the setup program which is then able to install the complete application. The key parts are not passwords used to open folders, but they are small portions of the folders or files without which the application cannot function. Not all embodiments may place key parts on the remote server, but doing so provides additional security against attempts to make unauthorized software installations.

Secret Codes: are codes assigned to the software which are required to allow software installation. The type, complexity, and use of these codes is not disclosed. More elaborate codes can be used to protect higher value software. An example of a secret code in an encryption key required to decrypt the files on an installation disc before installation.

Copybook for Disposable Passwords: is a small copybook that comes with the software when first purchased. It can initially contain one, two or multiple new disposable passwords, according to the need of a particular embodiment. These new disposable passwords can be hidden under an opaque protective coating which only becomes visible and legible when the protective coating is scratched off. Through this protective device, only the rightful owner of the software will have access to these vital passwords. The copybook for disposable passwords can also be used as a place to record the newly sent new disposable password which will be needed for reusing the installation software for a second and subsequent software installation. The copybook and installation software should be kept in a safe place.

According to one or more embodiments of the present invention, only the rightful owner of newly purchased software is provided with disposable passwords. A "disposable password" is a password that can be used either just once, or in certain embodiments, twice, once as "new" disposable password then later as a "used" disposable password. In certain embodiments, it can be used exactly three times: once as new disposable password and twice as a used disposable password.

In embodiments using two disposable passwords, when an individual purchases new software, he/she receives two disposable passwords that will be used to setup the software on his/her computer and without them, it is impossible to install the software. Upon completion of software installation, the owner will receive a new disposable password which he/she saves in a "copybook for disposable passwords" or similar secure location. The new disposable password is required for reinstallation of the software or (if the software license allows) installation on multiple machines, and without it, setup will be absolutely impossible, because the remote server used to authenticate the user will not send the necessary data to enable installation unless it receives the new disposable password plus a previously used disposable password.

In embodiments using a single disposable password, a user receives one disposable password with new software, which is used for one-time access to a remote server to complete registration and installation on a single machine. The remote server returns a new disposable password to enable any authorized re-installations or additional installations, and each such installation using a single copy of the distribution CD will require use of a new disposable password. The user must therefore carefully maintain a record of the successive disposable passwords in the copybook for disposable passwords or similar secure storage location.

The following example illustrates the installation process according to one or more embodiments of the present invention:

A software vendor makes a compact disc (CD or CD-ROM) that requires a password to open its setup folder. This password is called the "permanent password," and it comes printed on the CD cover when purchased.

In order to complete the software installation, an additional password called the "complex password" is required. In certain embodiments, access to portions of the software also requires "secret codes. Additionally, "key parts" of the software may be missing from the CD and must be downloaded from the remote server. The complex password, the secret codes, and the key parts are located in a "remote passwords folder" on a remote server.

The setup folder has a "setup" program capable of communicating with the remote server via the internet. The software folders on the CD may also be incomplete in that each folder requires a small part to become complete and functional. These parts are called "key parts," and they must be downloaded from the remote server.

The remote server contains a remote passwords folder for each legitimate copy of the CD offered for sale. The remote passwords folder contains the disposable passwords, the complex password, the hidden password, plus any secret codes and/or key parts. The remote server also has a program capable of communicating with the setup program on the CD.

The steps by which a new legitimate user installs software from the CD are:

1. The user inserts the CD into the CD drive.
2. The user double-clicks on the icon of the CD drive to open the CD.
3. Only one folder shows called the "setup" folder.
4. The user double-clicks on the setup folder. (If "auto-run" is enabled for the CD drive, steps 2-4 can happen automatically when the CD is inserted.)
5. A dialog box appears asking the user to type the permanent password.
6. The user types the permanent password (printed on the CD cover).
7. The setup program authenticates the password and communicates with the computer to retrieve the computer serial number.
8. A dialog box appears asking the user to provide the two disposable passwords (either two new disposable passwords, if this is the first installation, or one new and one used disposable password, if the installation disk has been previously used).
9. A dialog box appears, if needed, asking to connect the computer to the internet.
10. The computer is connected to the internet if it is not already connected.

11. The setup program establishes a connection with the remote computer.

12. The setup program sends the permanent password, the disposable passwords, a "hidden password," and the computer serial number to the remote server.

13. A program on the remote server authenticates the permanent password and opens the corresponding remote passwords folder (if one exists). It then checks the authenticity of the hidden password and the disposable passwords against copies stored in the remote passwords folder.

14. If all passwords match properly, the user is considered authorized, and the computer serial number is stored in the remote passwords folder. Depending on the terms of the software license (single machine, single user/multiple machine, multi-user workgroup, etc.) the remote server can allow one or more than one computer serial number to be associated with a particular remote passwords folder and thus a particular installation disc.

15. The remote server then returns the complex password plus any secret codes and/or key parts required to run the software installation program plus a new disposable password. These returned data may optionally be encrypted for additional security.

16. If the internet connection is temporary, it can be disconnected at this point.

17. The setup program decrypts the received data, authenticates the complex password, and proceeds with the software installation.

18. When the software installation is complete, the complex password and secret codes and/or key parts are deleted, so that installation cannot be repeated without a fresh authentication from the remote server.

19. The new disposable password is displayed to the user who writes it down in the copybook for disposable passwords for future use.

20. Installation is now complete and the user can remove the CD and save it with the copybook for disposable passwords in a safe place.

The time needed to be connected to the internet is only few seconds because steps 12-15 typically involve transfer of only a small amount of data each way. After step 15, the internet connection is no longer needed.

In this example, each CD offered for sale has its own assigned remote passwords folder on the remote server. Thus, if ten million CDs are made, the remote server should contain ten million folders, one for each CD. Each remote passwords folder initially contains a number of disposable passwords, or alternatively, new disposable passwords can be randomly generated as needed. Depending on the terms of the software license, the number of issuable disposable passwords (the number of times that re-authentication is allowed) may vary, or it can be unlimited.

In accordance with one or more embodiments of the present invention, each disposable password can be used many times, but only once as a new disposable password, then as a used disposable password, then, in certain embodiments, as a password to buy more new disposable passwords (useful, for example, if the software license allows a fixed number of installations or re-installations from one CD). The remote server will not send the complex password and the secret codes/key parts unless it receives a new disposable password never previously used plus one previously used disposable password (the most recently used disposable password in some embodiments).

Each time the CD is used, a new disposable password is sent to the remote server which, in turn, sends back another new disposable password for later use. Consequently, any unlawfully copied CD will be useless, because the new disposable password is only known to the rightful owner who receives a different new disposable password each time he installs software from the CD.

In accordance with one or more embodiments of the present invention, if the software license specifies a limited number of installations, after using all the allocated new disposable passwords, the CD cannot be used for further installations unless the user buys a new batch of new disposable passwords. This can be done, for example, over the internet, by sending the permanent password which determines the remote passwords folder assigned to this particular CD. If desired, the user could also be required to send the first plus the second disposable password, or the first plus the second plus the last disposable password to guarantee that the user is the rightful owner of the CD. The user must also pay the fee necessary to purchase a specific number of new disposable passwords. This can be a convenient way for a software vendor to manage per-user licenses for a workgroup that can conveniently share a single installation CD. Price discounts can be offered for quantity purchases and reorders.

When a new disposable password is used, the remote server marks that disposable password as used or it moves it to a folder named "used disposable passwords" or similar. These disposable passwords can only be "used disposable passwords" after the first use. The process is repeated each time an installation is made until all disposable passwords are marked as used or all new disposable passwords are used up. Then the software can no longer be installed from that CD until a new batch of disposable passwords is purchased.

In accordance with one or more embodiments of the present invention, the first two disposable passwords can be sent to the CD buyer by an e-mail instead of placing it inside the copybook for disposable passwords, guaranteeing that only the CD buyer will know the first two disposable passwords. Thus, if someone other than the purchaser opens the CD box they will not find the disposable passwords. Alternatively, the first two disposable passwords can be created and given to the buyer by the CD vendor, and the CD manufacturer can assign the purchaser's two disposable passwords to the remote passwords folder assigned to that particular CD as identified by the permanent password and hidden password. And, as only the purchaser has the legal copy of the CD, any unlawfully created copy will be useless, as no one other than the purchaser has the disposable passwords. This method will compel everyone to buy his/her CD from a licensed vendor.

In accordance with one or more embodiments of the present invention, the disposable passwords are printed on a plastic card and hidden under an opaque protective coating. When the protective coating is scratched off, the disposable password is revealed. The CD will come with a plastic card containing one, two, three or more disposable passwords, all invisible and protected by an opaque coating. The extra disposable passwords can be for emergency use when a malfunction occurs on the internet and the new disposable password is not received. In such circumstances, the CD owner can use one of the backup disposable passwords by scratching off the next disposable password on the plastic card to setup his/her CD.

For CDs containing operating systems, the setup program should be capable of setting up all the necessary programs on the computer which are absolutely necessary to have a functioning computer capable of connecting itself to the internet. (This is vitally important when an operating system is installed on a computer for the first time.) The user is then capable of doing all the steps explained above, enabling the computer to connect to the internet and receive the complex password plus the secret codes and the key parts. The setup program can be configured so that any such rudimentary operating system is automatically deleted if the installation does not become properly authenticated and authorized within a suitable window of time.

In accordance with one or more embodiments of the present invention, it is not necessary to distribute software on a portable medium such as a CD. Instead, the software can be downloaded from a remote server. In a retail setting, a user would purchase a box containing two cards where the first card has the permanent password printed on it, and the second has one or more disposable passwords hidden under an opaque protective coating. The user would then go to the software vendor's web site to download the software instead of loading it from a CD. Installation would still require authentication by running a setup program exactly as for software purchased on CD.

In accordance with one or more embodiments of the present invention, the entire purchase can also be made over the internet. After paying for a software license, the software vendor would send the permanent and disposable passwords to the user via e-mail (encrypted, if desired), and the user would download the installation software from the internet.

If the user is purchasing a set of disposable passwords for a multi-user installation, purchasing over the internet in this way can be easier. Further, errors due to miscopying of disposable passwords into the copybook for disposable passwords can be avoided. In certain embodiments, the user does even not receive any new disposable passwords from the remote server, because he always uses purchased one-time disposable passwords for each installation. If the remote server requires two disposable passwords, the user provides one new disposable password and one previously used disposable password for each installation.

In accordance with one or more embodiments of the present invention, three disposable passwords can be required for each installation. In these embodiments, the user provides one new disposable password and two previously used disposable passwords. For added security, each disposable password can be used once as a new disposable password and exactly twice as a used disposable password. Any password which has already been used a total of three times would not be accepted.

In accordance with one or more embodiments of the present invention, the computer serial number is used to register a particular installation and to authorize re-installation when needed. The serial number can also be encrypted and stored in the application itself or portions thereof. The software application or those portion protected in this way can check the actual computer serial number against the stored number each time it is run and abort if a match is not found. This serial number check can protect against unauthorized copies of software created by file copying methods or by backup methods starting from the installed application rather than the installation disc. For example, if a backup copy is "restored" to a different (unauthorized) machine, the serial numbers would not match, and the software would not run. Depending on the design of a particular application, the serial number can protect entire applications, individual functions or subroutines, data folders, or other components as appropriate to that application.

Since the computer serial number is also stored in the remote passwords folder on the remote server, no one can install the software on his/her computer unless he/she has the disposable passwords which only the legal owner has. The software vendor may limit the software to be setup on one computer or two or three as the vendor sees fit in accordance with license terms provided. For example, a vendor could permit single users to install software on two laptops and one desktop computer if desired.

In accordance with one or more embodiments of the present invention, all passwords that are kept on the remote server are stored in encrypted form, and all passwords stored digitally with the distribution medium are also stored in encrypted form. Further, all data transmitted to or from the remote server can also be encrypted, so that even were such data to be intercepted, it would not be useful to an unauthorized person. The method of encryption and any required encryption keys can be proprietary and do not need to be disclosed, since the software vendor controls both ends of all communications and all use of passwords.

A user only ever sees and knows the permanent password and the disposable passwords; neither the user nor any unauthorized person has any knowledge of the complex password or the hidden password, which are used solely by proprietary software and proprietary communications. The methods of generation, storage, and encryption of the complex password and hidden password are known only to the creators of the software.

In accordance with one or more embodiments of the present invention, when the complex password is sent by the remote server to the setup program, it is sent in encrypted form, and when the setup program receives the encrypted complex password, it reverses the encryption and compares it with the complex password secretly hidden in the setup program, and only if they match each other, does the setup program continue with software installation. In either case, the complex password is immediately deleted once the comparison is made.

In accordance with one or more embodiments of the present invention, a copy of the complex password is not hidden in the setup program at all. The complex password is instead used as a secret key to enable software installation. Any suitable algorithm can be used that requires a secret key, and the algorithm itself can be secret. For example, the complex password can serve as a key for a decryption algorithm required to decrypt some or all of the installation files.

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

What is claimed is:

1. A method for preventing unauthorized installation of application software comprising
   (a) distributing application software with a user-readable permanent password, a user-readable disposable password, and a hidden password, wherein said hidden password can be read by a software setup program;
   (b) causing said software setup program to run on a target installation computing machine and to query a user for said permanent password and said disposable password;
   (c) causing said software setup program to contact a designated remote server and transmit (1) said permanent password, (2) said disposable password, (3) said hidden password, and (4) a serial number associated with said target installation computing machine;

(d) causing software on said designated remote server to compare said permanent password, said disposable password, and said hidden password against stored records of legitimately distributed software, and only if all three passwords match against said stored records, causing said designated remote server to store said serial number in said stored records, to replace said disposable password in said stored records with a second disposable password and to return to said software setup program (1) a complex password and (2) said second disposable password; and (e) causing said software setup program to display said second disposable password to said user, to attempt to use said complex password to enable said software setup program to proceed with the installation of said application software on said target installation computing machine, to abort if said complex password cannot successfully enable installation, and to delete said complex password.

2. The method of claim 1, wherein, after completing steps (a) through (e), a user reinstalls said application software on said target installation computing machine or installs said application on a second target installation computing machine by a method comprising (f) causing said software setup program to run on a target installation computing machine and to query a user for said permanent password and a disposable password, wherein said user responds with said user-readable permanent password and said second disposable password;

(g) causing said software setup program to contact a designated remote server and transmit (1) said permanent password, (2) said second disposable password, (3) said hidden password, and (4) said serial number associated with said target installation computing machine;

(h) causing software on said designated remote server to compare said permanent password, said second disposable password, said hidden password, and said serial number against said stored records of legitimately distributed software, and only if all three passwords and said serial number match against said stored records, causing said designated remote server to replace said second disposable password in said stored records with a third disposable password and to return to said software setup program (1) said complex password and (2) said third disposable password;

(i) causing said software setup program to display said third disposable password to said user, to attempt to use said complex password to enable said software setup program to proceed with the installation of said application software on said target installation computing machine, to abort if said complex password cannot successfully enable installation, and to delete said complex password.

3. The method of claim 1, wherein step (d) further comprises causing said software on said designated remote server to return secret codes necessary to enable installation.

4. The method of claim 1, wherein step (d) further comprises causing said software on said designated remote server to return key parts of said application software necessary to complete installation.

5. The method of claim 1, wherein said application software is distributed on CD-ROM or DVD-ROM, and said permanent password and said disposable password are provided in printed form.

6. The method of claim 1, wherein application software is distributed over the internet, and said permanent password and said disposable password are provided separately by e-mail.

7. The method of claim 1, wherein said software setup program first queries a user for said permanent password and aborts if said permanent password does not match a digitally stored version of said permanent password.

8. The method of claim 1, wherein said application software is installed with said serial number stored in a hidden location, and wherein said application software cannot be run if said serial number does not match the serial number of the machine on which a user attempts to run said application software.

9. A method for preventing unauthorized installation of application software comprising (a) distributing application software with a user-readable permanent password, two user-readable disposable passwords, and a hidden password, wherein said hidden password can be read by a software setup program;

(b) causing said software setup program to run on a target installation computing machine and to query a user for said permanent password and said two disposable passwords;

(c) causing said software setup program to contact a designated remote server and transmit (1) said permanent password, (2) said two disposable passwords, (3) said hidden password, and (4) a serial number associated with said target installation computing machine;

(d) causing software on said designated remote server to compare said permanent password, said two disposable passwords, and said hidden password against stored records of legitimately distributed software, and only if all four passwords match against said stored records, causing said designated remote server to store said serial number in said stored records, to mark the stored copies of said two disposable passwords in said stored records as "user," and to return to said software setup program (1) a complex password and (2) a third disposable password; and (e) causing said software setup program to display said third disposable password to said user, to attempt to use said complex password to enable said software setup program to proceed with the installation of said application software on said target installation computing machine, to abort if said complex password cannot successfully enable installation, and to delete said complex password.

10. The method of claim 9, wherein, after completing steps (a) through (e), a user reinstalls said application software on said target installation or installs said application on a second target installation computing machine by a method comprising (f) causing said software setup program to run on a target installation computing machine and to query a user for said permanent password and two disposable passwords, wherein said user responds with said user-readable permanent password, one of the disposable passwords from step (a), and said third disposable password;

(g) causing said software setup program to contact a designated remote server and transmit (1) said permanent password, (2) said two disposable passwords, (3) said hidden password, and (4) said serial number associated with said target installation computing machine;

(h) causing software on said designated remote server to compare said permanent password, said hidden password, and said serial number against said stored records of legitimately distributed software, and;

only if both passwords and said serial number match against said stored records, to further compare said one of the disposable passwords from step (a) against the disposable passwords marked "used" in said stored records, and;

only if a match is found, to further compare said third disposable password against the stored record of the most recently sent disposable password, and;

only if said third disposable password matches said stored record, causing said designated remote server to mark said third disposable password in said stored records as "used," and to return to said software setup program (1) said complex password and (2) a fourth disposable password;

(i) causing said software setup program to display said fourth disposable password to said user, to attempt to use said complex password to enable said software setup program to proceed with the installation of said application software on said target installation computing machine, to abort if said complex password cannot successfully enable installation, and to delete said complex password.

11. The method of claim 9, wherein step (d) further comprises causing said software on said designated remote server to return secret codes necessary to enable installation.

12. The method of claim 9, wherein step (d) further comprises causing said software on said designated remote server to return key parts of said application software necessary to complete installation.

13. The method of claim 9, wherein said application software is distributed on CD-ROM or DVD-ROM, and said permanent password and said disposable password are provided in printed form.

14. The method of claim 9, wherein application software is distributed over the internet, and said permanent password and said disposable password are provided separately by e-mail.

15. The method of claim 9, wherein said software setup program first queries a user for said permanent password and aborts if said permanent password does not match a digitally stored version of said permanent password.

16. A method for preventing unauthorized installation of application software comprising (a) distributing application software with a user-readable permanent password, two user-readable disposable passwords, and a hidden password, wherein said hidden password can be read by a software setup program;

(b) causing said software setup program to run on a target installation computing machine and to query a user for said permanent password and said two disposable passwords;

(c) causing said software setup program to contact a designated remote server and transmit (1) said permanent password, (2) said two disposable passwords, (3) said hidden password, and (4) a serial number associated with said target installation computing machine;

(d) causing software on said designated remote server to compare said permanent password, said two disposable passwords, and said hidden password against stored records of legitimately distributed software, and only if all four passwords match against said stored records, causing said designated remote server to store said serial number in said stored records, to mark the stored copies of said two disposable passwords in said stored records as "used," and to return to said software setup program (1) a complex password and (2) a third disposable password;

(e) causing said software setup program to display said third disposable password to said user, to attempt to use said complex password to enable said software setup program to proceed with the installation of said application software on said target installation computing machine, to store said serial number in a hidden location, to abort if said complex password cannot successfully enable installation, and to delete said complex password; and wherein said application software cannot be run if said serial number does not match the serial number of the machine on which a user attempts to run said application software.

* * * * *